United States Patent
Hauck et al.

(10) Patent No.: US 7,076,716 B1
(45) Date of Patent: Jul. 11, 2006

(54) EARLY ACKNOWLEDGEMENT OF PRIMARY PACKETS

(75) Inventors: Jerrold V. Hauck, Fremont, CA (US); David W. LaFollette, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1261 days.

(21) Appl. No.: 09/059,533

(22) Filed: Apr. 13, 1998

(51) Int. Cl.
*G08C 25/02* (2006.01)
*H04L 1/18* (2006.01)

(52) U.S. Cl. ..................................... 714/748
(58) Field of Classification Search ............... 714/748, 714/749, 4; 340/825.52; 370/432; 375/222; 710/105
See application file for complete search history.

(56) References Cited

U.S. PATENT DOCUMENTS

| | | | | |
|---|---|---|---|---|
| 3,866,175 A | * | 2/1975 | Seifert, Jr. et al. | 340/825.1 |
| 4,584,684 A | * | 4/1986 | Nagasawa et al. | 714/749 |
| 4,712,214 A | * | 12/1987 | Meltzer et al. | 714/748 |
| 4,779,274 A | * | 10/1988 | Takahashi et al. | 714/748 |
| 4,831,518 A | * | 5/1989 | Yu et al. | 714/4 |
| 4,860,292 A | * | 8/1989 | Newman et al. | 714/748 |
| 4,888,684 A | * | 12/1989 | Lilja et al. | 710/109 |
| 4,896,151 A | * | 1/1990 | Kuranami et al. | 340/825.52 |
| 4,914,653 A | * | 4/1990 | Bishop et al. | 370/462 |
| 4,985,890 A | * | 1/1991 | Matsumoto et al. | 370/439 |
| 5,010,553 A | * | 4/1991 | Scheller et al. | 714/751 |
| 5,020,020 A | * | 5/1991 | Pomfret et al. | 709/235 |
| 5,187,780 A | * | 2/1993 | Clark | 710/106 |

(Continued)

FOREIGN PATENT DOCUMENTS

GB         2266032 A    * 10/1993

OTHER PUBLICATIONS

"IEEE Standard for a High Performance Serial Bus", IEEE Std. 1394, published by IEEE Inc., New York, NY, Published 1996.*

(Continued)

*Primary Examiner*—Joseph Torres
(74) *Attorney, Agent, or Firm*—Blakely, Sokoloff, Taylor & Zafman LLP

(57) ABSTRACT

A method and apparatus for reclaiming bus bandwidth on a full duplex bus. A source node sends a primary packet toward a destination node along a full duplex bus. If the destination node identifies an inability to accept the primary packet, it sends a NAK in the opposite direction along the full duplex bus towards the source node. Upon receiving the NAK, the source node aborts packet transmission of the primary packet which by virtue of the NAK has been identified as futile. Accordingly, the bandwidth, which would have otherwise have been used for the futile packet transmission, can be reclaimed and used for some other purpose.

10 Claims, 5 Drawing Sheets

U.S. PATENT DOCUMENTS

| | | | | |
|---|---|---|---|---|
| 5,257,384 | A | * | 10/1993 | Farrand et al. ............. 710/105 |
| 5,495,481 | A | * | 2/1996 | Duckwall ................... 370/462 |
| 5,592,536 | A | * | 1/1997 | Parkerson et al. .......... 455/462 |
| 5,664,154 | A | * | 9/1997 | Purcell et al. .............. 711/167 |
| 5,802,048 | A | * | 9/1998 | Duckwall ................... 370/389 |
| 5,923,662 | A | * | 7/1999 | Stirling et al. .............. 370/432 |
| 5,987,061 | A | * | 11/1999 | Chen .......................... 375/222 |
| 6,012,117 | A | * | 1/2000 | Traw et al. ................. 710/123 |
| 6,038,234 | A | * | 3/2000 | LaFollette et al. .......... 370/443 |
| 6,154,816 | A | * | 11/2000 | Steely et al. ................ 711/150 |
| 6,185,184 | B1 | * | 2/2001 | Mattaway et al. .......... 370/230 |
| 6,208,653 | B1 | * | 3/2001 | Ogawa et al. ............... 370/395 |
| 6,453,406 | B1 | * | 9/2002 | Sarnikowski et al. ......... 712/11 |

OTHER PUBLICATIONS

"P1394A Enhancements", Jan. 3, 1997.*

High Speed Serial Interface Protocol, IBM Technical Disclosure Bulletin, Dec. 1991, US, vol. No.: 34, Issue No.: 7A, pp. No.: 355-365, Publication-Date: Dec. 1, 1991.*

Derwent-Acc-No.: 1990-049380, Derwent-Week: 199007, 1999.*

*P1394B Arbitration Acceleration*; Teener, Michael D. Johas, Firefly, Inc., 1997, Slides 1-9.

*P1394A Enhancements*, Jan. 3, 1997, pp. 1-48.

* cited by examiner

EARLY ACKNOWLEDGEMENT OF PRIMARY PACKETS

BACKGROUND OF THE INVENTION (1) Field of the Invention

The invention relates to data transfer systems. More specifically the invention relates to bandwidth reclamation on a full duplex bus.

(2) Related Art

For high speed data transfers over a distance, various high speed serial data transfer mechanisms have been developed. The IEEE Standard for a High Performance Serial Bus, IEEE Std. 1394-1995 published Aug. 30, 1996 (1394-1995 Standard) and its progeny provide a high speed serial protocol which permits implementation of high speed data transfers. The existing progeny includes P1394a Draft Standard for a High Performance Serial Bus (1394a Standard) and P1394b Draft Standard for a High Performance Serial Bus (1394b Standard). Generically, systems implementing 1394-1995, 1394a, 1394b or subsequent revisions and modifications thereof are referred to herein as 1394 systems.

In 1394 systems a plurality of nodes are organized into a tree topology. Additionally, all nodes are initially deemed peer to peer but on bus reset, one node assumes root status while the remaining nodes become branches and leaves of the topology. Both 1394-1995 and 1394a are half-duplex protocols. Thus, data may only flow in one direction at any given time. Typically a primary packet is sent by a source node out all ports. A downstream destination node identifies from a header of the packet that the packet is directed to it. The recipient then receives the packet, and after the entire primary packet is received and the acknowledge gap permits reversing the bus, an acknowledgment (ACK) packet is sent to the source. If the packet is not completely received, the destination node still waits until the transmission and ACK gap are complete before sending an ACK packet to the source indicating that the source should send the packet again later because the destination was busy or an error occurred.

Both of these protocols employ a discrete arbitration phase during which all nodes seeking access to the bus send arbitration requests to the root node. The root node then resolves the arbitration and grants the bus to one of the arbitrating nodes. During this discrete arbitration phase no other useful work can be done on the bus.

The 1394b Standard provides a full-duplex serial bus protocol. Busses employing the 1394b Standard may be able to reduce the ACK gap as the bus direction need not be reversed, but they still generally follow the primary packet/ACK scheme discussed above. Bus bandwidth is often a scarce resource. Efforts to improve bus efficiency are ongoing.

BRIEF SUMMARY OF THE INVENTION

An apparatus for improving bus efficiency is disclosed. A transceiver is provided. A state machine is coupled to the transceiver to generate a NAK concurrently with the receipt of a packet when the packet cannot be successfully accepted.

DETAILED DESCRIPTION OF THE INVENTION

A source node sends a primary packet toward a destination node along a full duplex bus. If the destination node identifies that it cannot receive the packet, it sends an acknowledgment (ACK) packet in the opposite direction along the full duplex bus towards the source node. The ACK packet contains a code indicating that the packet could not be successfully accepted and should be retried later. The 1394a Standard defines acknowledge codes which stimulate a retry including ack_busy_*; ack_tardy; and ack_*_error. As used herein, an ACK packet containing such a code, or any other signal that a data transmission will not be accepted and should be retried is termed a "NAK." Upon receiving the NAK, the source node aborts packet transmission of the primary packet which by virtue of the NAK has been identified as futile. Accordingly, the bandwidth which would have otherwise have been used for the futile packet transmission can be reclaimed and used for some other purpose.

Figure 1:
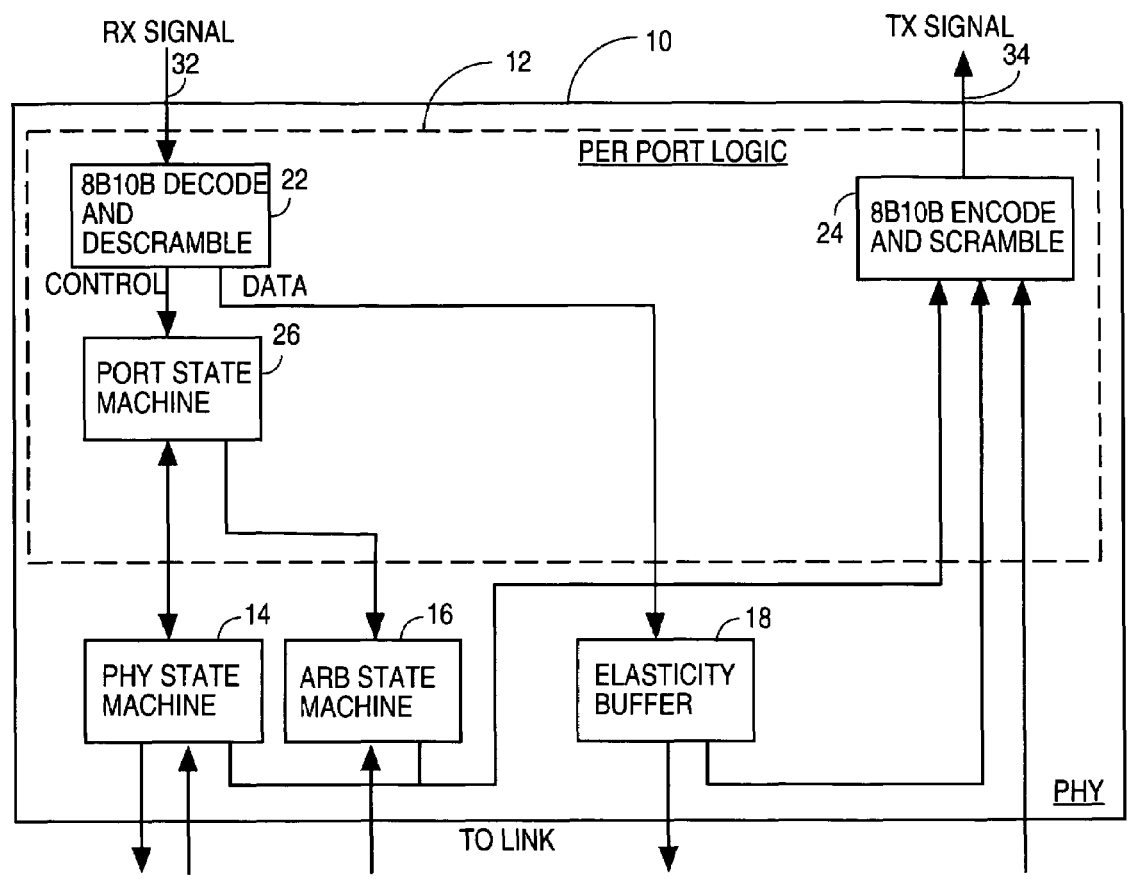
FIG. 1 is a block diagram of a physical layer of one embodiment of the invention.

Now referring to FIG. 1, a physical layer (PHY) 10 has one or more ports which can be connected to a serial bus not shown. For each such port, per port logic 12 is provided as part of PHY 10. The PHY 10 receives a receive signal 32 and transmits a transmit signal 34 through each active port. Per port logic 12 includes a decoder 22 to decode and descramble the incoming receive signal 32. In one embodiment the decoder 22 is an 8B10B decoder and descrambler, which performs 8-bit 10-bit decoding. This means each 10-bit value coming in as the receive signal 32 is decoded into an 8-bit value. The decoder 22 is coupled to a port state machine 26 which receives a control value decoded by the decoder. Similarly, an encoder 24 is used to encode and scramble the outgoing transmit signal 34. In one embodiment of the invention the encoder performs 8B10B encoding. Analogous to the decode case, each byte of data to be transmitted is encoded as a 10-bit value. Thus, a number of codings exist that are not used for normal data encoding.

Additionally, the decoder 22 is coupled to an elasticity buffer 18. The elasticity buffer 18 buffers data decoded from the received signal 32 while that data is awaiting transfer to the link and/or repetition out on one or more ports of PHY 10 as the transmit signal 34. The PHY state machine 14 and the arbitration state machine 16 may be combined as a single state machine or may be implemented as two separate state machines. The PHY state machine 14 provides the intelligence for the PHY including generation of any PHY generated packets. The arbitration state machine 16 assesses incoming arbitration information and provides outgoing arbitration requests. If the node is originating a packet on the bus it is the nominal root node. The nominal root node has complete arbitration state information for the topology. Based on this information the arbitration state machine 16 of the nominal root node grants the arbitration request of a highest priority branch. Since nominal root status passes with the grant of the bus, each node should be able to act as arbitrator for the topology. Copending application entitled "Distributed Arbitration on a Full Duplex Bus," Ser. No. 09/017,451, describes at least one suitable embodiment of a distributed arbitration system. While much of the subsequent description is devoted to an embodiment in a distributed arbitration topology, the instant invention is also applicable to a non-distributed arbitration topology. For example, even in a system that uses a physical root node to conduct all arbitrations or those systems that continue to employ subaction gaps between each subaction, the invention provides significant bandwidth savings.

Figure 2A:
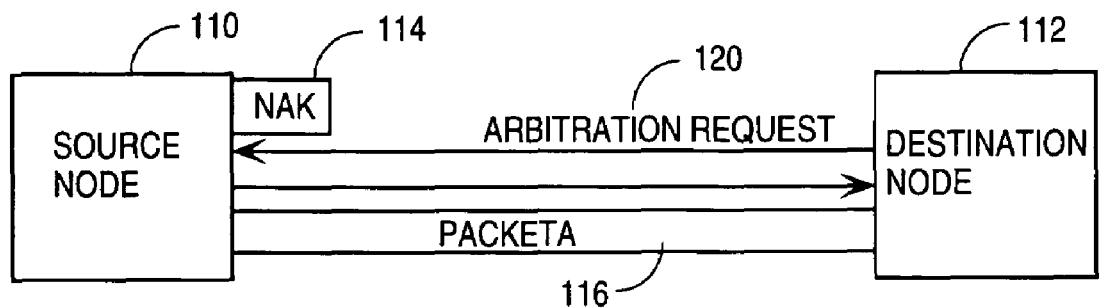
FIGS. 2*a* and 2*b* are block diagrams of a transaction between a source and destination node in one embodiment of the invention.
Figure 2B:
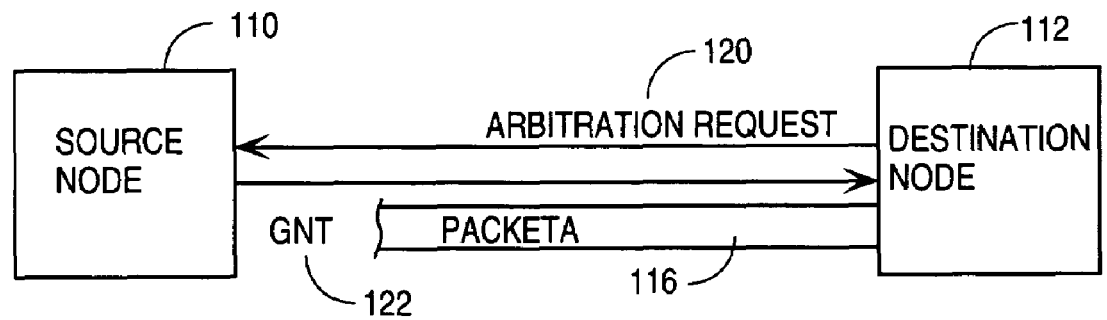

FIGS. 2a and 2b show a sample transaction in one embodiment of the invention. Source node 110 is transmitting a PACKETA 116 to destination node 112. Destination node 112 has determined that it cannot accept PACKETA 116. The inability to accept might be caused by e.g., insufficient available resources. This can often be identified from the packet header, e.g., the packet header indicates that the packet is of a size that would exceed the destination buffer resources. While PACKETA 116 is still being transmitted to destination node 112, destination node 112 transmits a NAK 114 upstream to source node 110. Upon sending the NAK 114, the destination node asserts its arbitration request 120 on the upstream line. In FIG. 2b, source node 110 having received NAK 114 previously, aborts PACKETA 116 and issues a grant 122 to the only requesting node, here destination node 112. By aborting the packet that must be resent later, the remaining packet time may be reclaimed and used for useful work.

In an alternative embodiment, which might be used where distributed arbitration is not available, the source node upon receiving the NAK aborts the packet. Then after a subaction gap all nodes may begin arbitrating through the physical root node. Because the start of the subaction gap occurs earlier in time e.g., bus bandwidth is not wasted continuing to send a futile packet, bus efficiency is improved.

Figure 3:
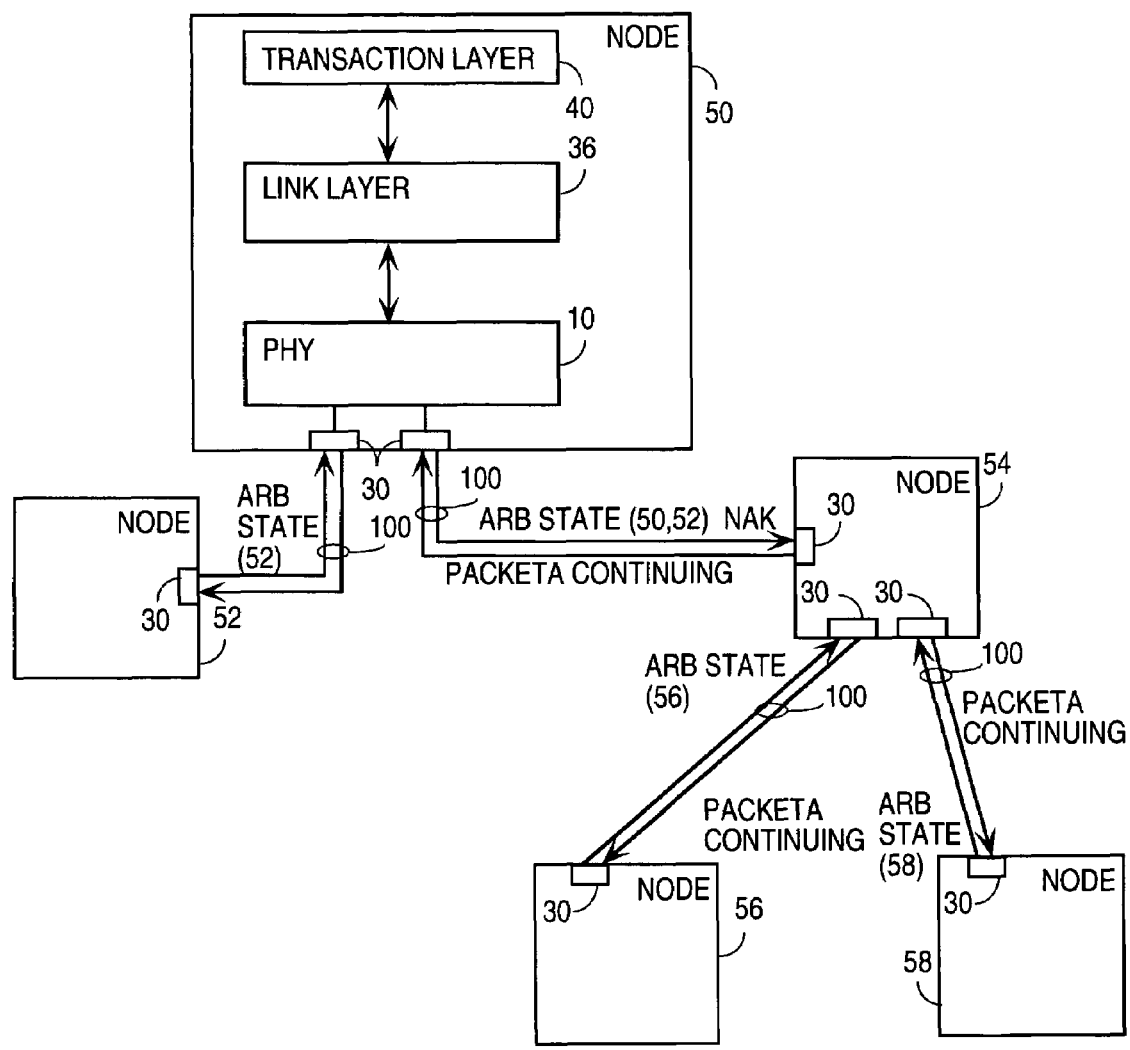
FIG. 3 is a block diagram of a tree topology of one embodiment of the invention.

FIG. 3 shows a system that includes a plurality of nodes 50–58. The nodes 50–58 are organized in a tree topology. In this topology node 50 is the physical root node. However, employing a distributed arbitration technique, which node is the nominal root, nominal branches and nominal leaves depends on which node is permitted to originate a packet on the bus. The nodes are all interconnected by a full duplex serial bus 100. In one embodiment, serial bus 100 follows the 1394b protocol. Each node has one or more ports 30 through which communication between serial bus 100 and PHY 10 is conducted. The PHY 10 communicates with a link layer 36, which in turn communicates with a transaction layer 40.

In FIG. 3, node 54 is transmitting a primary packet of a subaction (PACKETA) out all of its ports. Node 54 is therefore the nominal root node and receives arbitration information from each child node such that node 54 has the complete arbitration state of the topology available to it. Because node 54 is transmitting a packet on the bus, the opposite directional path towards node 54 from nodes 50, 56 & 58 is available. In a distributed arbitration case, the other node will forward arbitration state information in this upstream direction. In FIG. 3, it is presumed that the destination node is node 50. Node 50 having begun to receive PACKETA in a previous unit of time and identified an inability to successfully accept PACKETA transmits a NAK to node 54. The NAK may be followed by arbitration state information. Upon receiving the NAK in a next unit in time, node 54 will abort PACKETA and grant the bus to another requester. Inasmuch as current primary packet time may approach 42 μsec at 800 Mbps, aborting a packet after e.g. 10 μsec can often result in substantial opportunity to reclaim bandwidth. This is true even where the bus employs a discrete arbitration phase.

Figure 4:
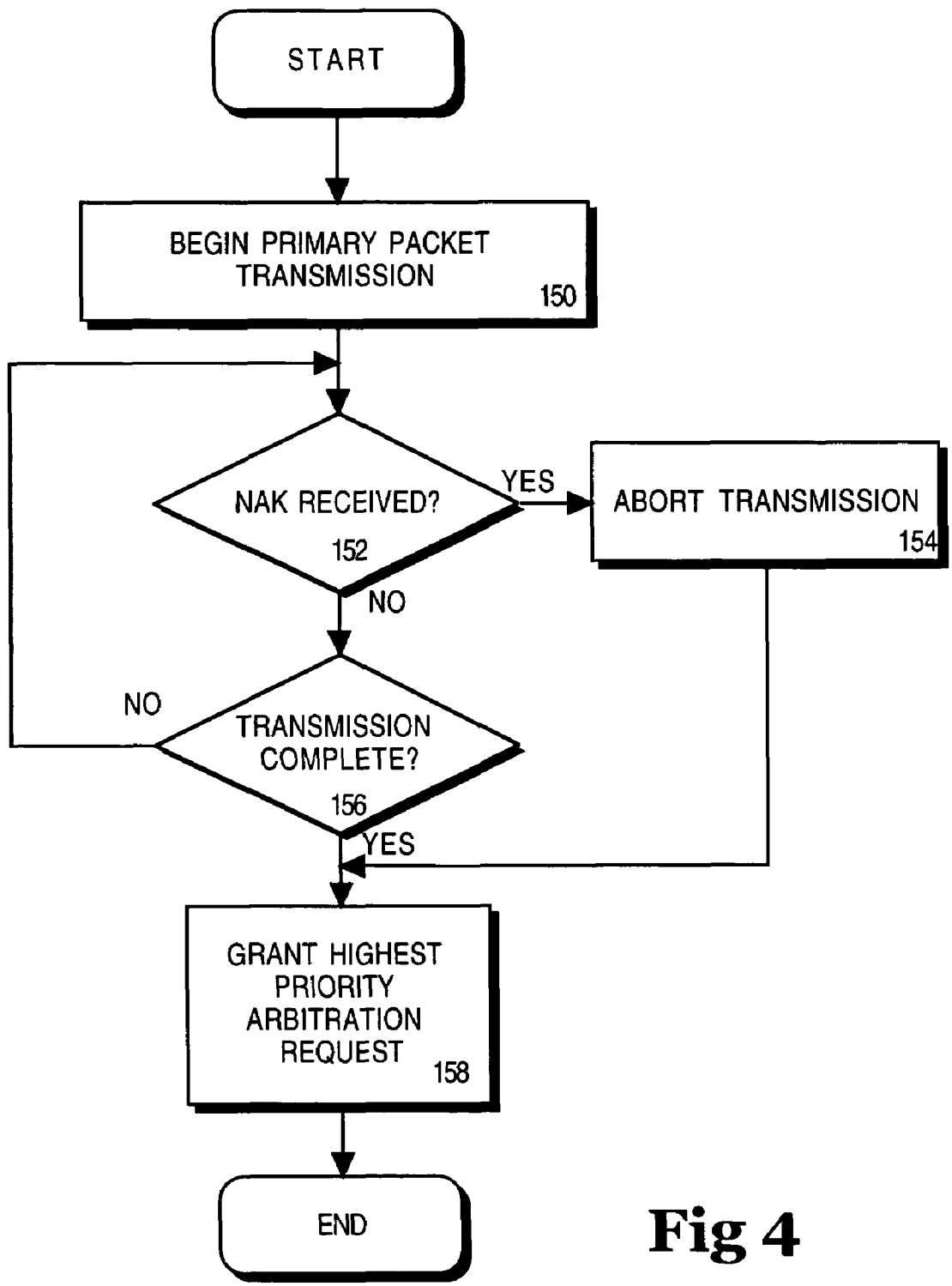
FIG. 4 is a flow diagram of source node activity in one embodiment of the invention.

FIG. 4 shows a flow chart of activity in the source node in one embodiment of the invention. At functional block 150, the source node begins transmitting a primary packet. If at decision block 152 a NAK has been received, the source node aborts the transmission at functional block 154. If, however, no NAK has been received at decision block 152, a determination is made at decision block 156 if the transmission is complete. If the transmission is complete (e.g., an acknowledgment received) or after aborting transmission, the source node grants the highest priority of the arbitration request at functional block 158. If the transmission is incomplete, the source node continues to transmit and watch for an incoming NAK.

Figure 5:
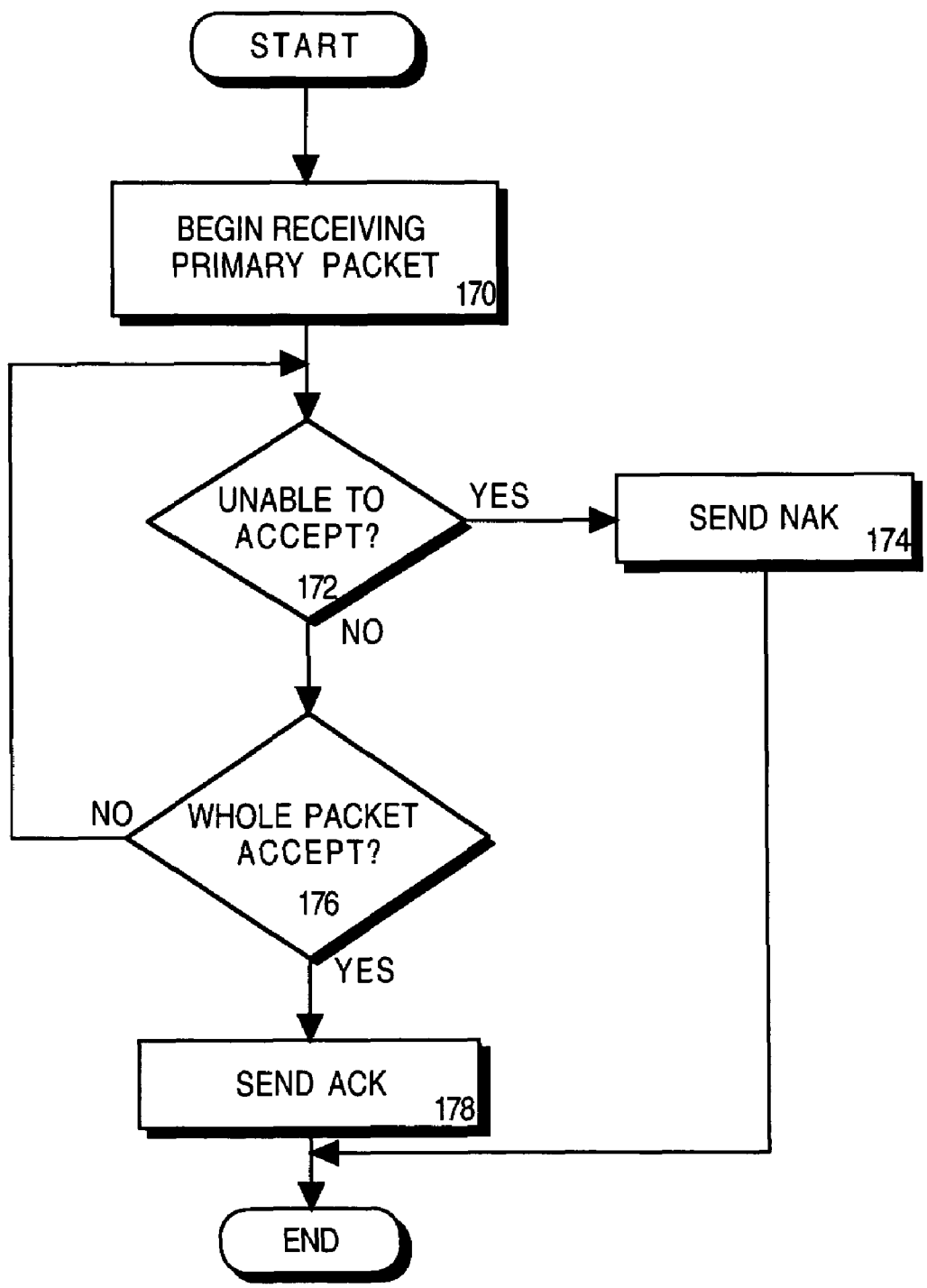
FIG. 5 is a flow diagram of destination node activity in one embodiment of the invention.

FIG. 5 shows a flow diagram of activity in a destination node of one embodiment of the invention. At functional block 170, the destination node begins receiving the primary packet transmitted by the source node. If an inability to successfully accept the packet is detected by the destination node at decision block 172, a NAK is sent at functional block 174. Otherwise, a determination is made if the whole packet has been accepted at decision block 176. If the whole packet has been accepted, an ACK packet is sent at functional block 178 indicating the packet has been successfully accepted. If, however, the whole packet has not yet been accepted at decision block 176, the destination node continues to receive and watch for an inability to complete packet acceptance.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   transmitting a primary packet from a source node towards a destination node on a full duplex bus;
   receiving a NAK while the primary packet is being transmitted; and
   aborting the transmission without sending all of the primary packet.

2. The method of claim 1 further comprising:
   reclaiming bandwidth not used as a result of aborting.

3. The method of claim 2 wherein reclaiming comprises:
   granting the bus to a highest priority requesting node; and
   beginning transmission of a next primary packet from the highest priority requesting node.

4. A system comprising:
   a full duplex bus;
   a source node coupled to the bus, the source node to transmit a primary packet; and
   a destination node coupled to the bus, to receive the primary packet, the destination node to generate a NAK if the primary packet cannot be successfully accepted, the NAK generated concurrently with the receipt of the primary packet.

5. The system of claim 4 wherein the source node aborts a transmission responsive to the NAK.

6. The system of claim 5 further comprising:
a plurality of additional nodes coupled to the bus to form a tree topology wherein the source node grants the bus to a highest priority requesting node upon aborting the transmission.

7. The system of claim 4 wherein an inability to accept the primary packet is caused by unavailability of a needed resource.

8. An apparatus comprising:
a transceiver;
a state machine coupled to the transceiver, the state machine to generate NAK in response to an inability to successfully accept a primary packet, the NAK generated concurrently with an ongoing arrival of the primary packet.

9. The apparatus of claim 8 wherein the inability to accept is caused by resource unavailability.

10. The apparatus of claim 8 wherein when the apparatus is a source of a primary packet, it aborts a transmission of the primary packet when a NAK is received.

* * * * *